(12) United States Patent
Seibt

(10) Patent No.: US 9,446,688 B2
(45) Date of Patent: Sep. 20, 2016

(54) VEHICLE SEAT HAVING AN AXIALLY SECURED SHAFT

(75) Inventor: Jörg Seibt, Bruehl (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 0 days.

(21) Appl. No.: 13/820,062

(22) PCT Filed: Sep. 8, 2011

(86) PCT No.: PCT/EP2011/004533
§ 371 (c)(1),
(2), (4) Date: May 10, 2013

(87) PCT Pub. No.: WO2012/031764
PCT Pub. Date: Mar. 15, 2012

(65) Prior Publication Data
US 2013/0221721 A1    Aug. 29, 2013

(30) Foreign Application Priority Data

Sep. 10, 2010 (DE) .......................... 10 2010 044 947

(51) Int. Cl.
*B60N 2/22* (2006.01)

(52) U.S. Cl.
CPC ............. *B60N 2/22* (2013.01); *B60N 2205/50* (2013.01)

(58) Field of Classification Search
CPC .............................. B60N 2/22; B60N 2205/50
USPC ........ 297/361.1, 362, 354.12, 354.1, 215.12, 297/354.13, 362.12, 362.11
See application file for complete search history.

(56) References Cited

U.S. PATENT DOCUMENTS

| | | | | |
|---|---|---|---|---|
| 1,122,040 A * | 12/1914 | Springsteen et al. | ......... | 297/211 |
| 2,969,705 A * | 1/1961 | Becker | ......... | 411/527 |
| 2,986,059 A * | 5/1961 | Duffy et al. | ......... | 411/437 |
| 3,395,602 A * | 8/1968 | Strange | ......... | 411/437 |
| 3,426,386 A | 2/1969 | Wise | | |
| 3,501,995 A * | 3/1970 | Lanius, Jr. | ......... | 411/437 |
| 3,557,655 A * | 1/1971 | Coe | ......... | 411/436 |
| 4,448,381 A * | 5/1984 | Anspaugh et al. | ......... | 248/394 |
| 4,865,385 A * | 9/1989 | Suzuki | ......... | 297/362 |
| 6,357,828 B1 | 3/2002 | Sugimoto | | |
| 7,055,905 B2 * | 6/2006 | Spey et al. | ......... | 297/361.1 |
| 7,703,852 B2 | 4/2010 | Wahls et al. | | |
| 8,979,193 B2 | 3/2015 | Nonomiya | | |

FOREIGN PATENT DOCUMENTS

| CN | 2732537 Y | 10/2005 |
|---|---|---|
| CN | 101143569 A | 3/2008 |

(Continued)

OTHER PUBLICATIONS

International Search Report for International Application No. PCT/EP2011/004566 and English translation, date of mailing Nov. 9, 2011, 5 pages.

(Continued)

*Primary Examiner* — Milton Nelson, Jr.
(74) *Attorney, Agent, or Firm* — Foley & Lardner LLP

(57) ABSTRACT

A vehicle seat has a backrest part which is provided on a seat part such that the former can be rotated by a backrest adjuster. The backrest adjuster has a shaft which preferably transmits a torque to the backrest adjuster. And axial securing mechanism is provided on the shaft at both ends.

1 Claim, 5 Drawing Sheets

(56) References Cited

FOREIGN PATENT DOCUMENTS

| | | |
|---|---|---|
| CN | 10125856 A | 8/2008 |
| CN | 101450634 A | 6/2009 |
| CN | 101722880 A | 6/2010 |
| DE | 19921810 A1 | 11/2000 |
| DE | 10037190 A1 | 2/2002 |
| EP | 1938712 A | 7/2008 |
| JP | 04-111915 U | 4/1992 |
| JP | 2000-027102 | 1/2000 |
| JP | 2002-101996 | 4/2002 |
| JP | 2009-299824 | 12/2009 |

OTHER PUBLICATIONS

Office Action dated Jun. 10, 2014 in corresponding Japanese Application No. 2013-527495 and English translation, 5 pages.

International Preliminary Report on Patentability mailed Mar. 21, 2013, as received in International Application No. PCT/EP2011/004533.

Office Action dated Nov. 3, 2014, in corresponding Chinese application No. 201180043383.5, 6 pages.

* cited by examiner

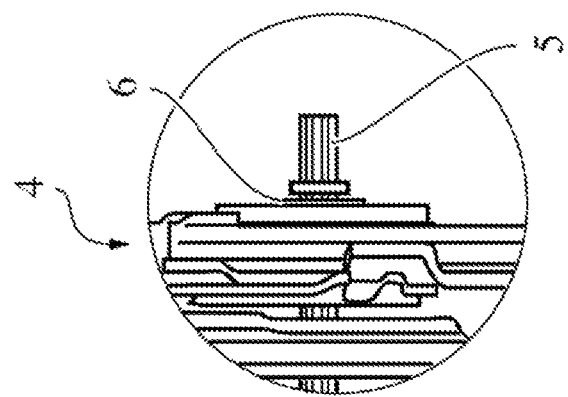
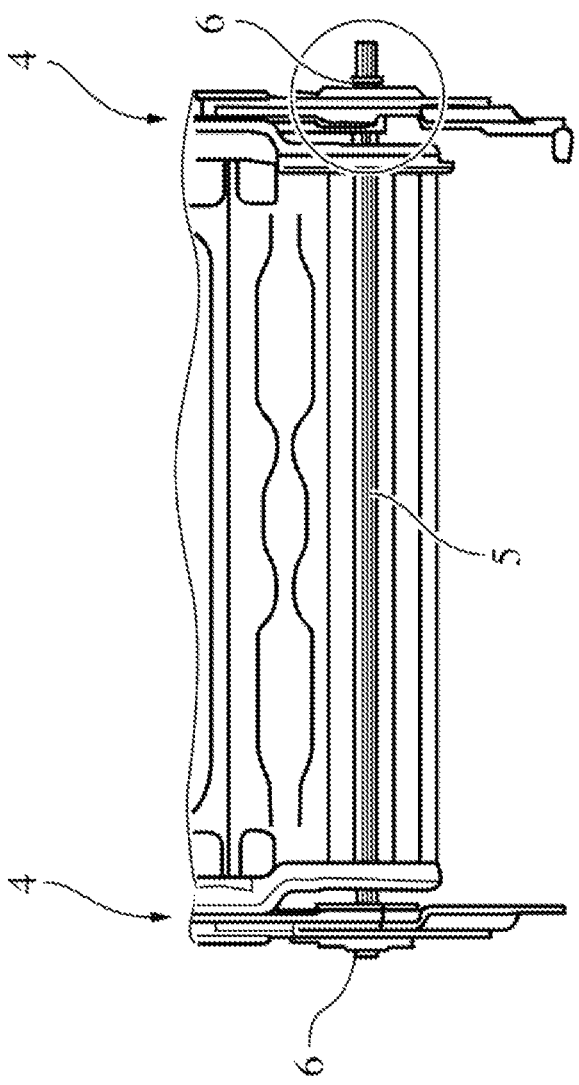

VEHICLE SEAT HAVING AN AXIALLY SECURED SHAFT

CROSS REFERENCE TO RELATED APPLICATIONS

The present application is a National Stage of International Application No. PCT/EP2011/004533 filed on Sep. 8, 2011, which claims the benefit of German Patent Application No. 10 2010 044 947.4 filed on Sep. 10, 2010, the entire disclosures of which are incorporated herein by reference.

The present invention relates to a vehicle seat having a backrest part which is provided on a seat part such that it can be rotated by means of a backrest adjuster, the backrest adjuster having a shaft which preferably transmits a torque to the backrest adjuster.

Nowadays, very high safety requirements are made of vehicle seats. For example, it has to be ensured that the vehicle seat can absorb the loads which occur in the case of a rear collision.

It was therefore the object of the present invention to provide a vehicle seat of this type.

The object is achieved by way of a vehicle seat having a backrest part which is provided on a seat part such that it can be rotated by means of a backrest adjuster, the backrest adjuster having a shaft which preferably transmits a torque to the backrest adjuster and an axial securing means being provided on the shaft at both ends.

The vehicle seat according to the invention has the advantage that the forces in the Y-direction, that is to say transversely with respect to the driving direction, which are produced in the case of a rear collision do not exceed the load-absorbing capability of the vehicle seat, in particular of the backrest adjuster.

The present invention relates to a vehicle seat which comprises a backrest part and a seat part. A vehicle seat of this type can provide space for one or more persons. The vehicle seat according to the invention can also be a seat bench.

The backrest is provided on the seat part such that it can be rotated by means of a backrest adjuster, for example in order for it to be possible to adjust the inclination of the backrest for comfort purposes. Backrest adjusters of this type are provided on the right and left on the vehicle seat according to the invention. According to the invention, the vehicle seat has a shaft which transmits a torque to at least one of the two backrest adjusters in order to change the angular position of the backrest.

The shaft is preferably of tubular configuration. The shaft preferably has positively locking and/or nonpositive means on its circumference, in order for it to be possible to transmit a torque to the backrest adjuster.

This shaft is then provided with an axial securing means at both ends, by way of which axial securing means it is prevented that the shaft is pulled out of the respective backrest adjuster, for example, in the case of a rear collision, as a result of which firstly the stability of the backrest adjuster but also the stability of the vehicle seat overall would be endangered.

The axial securing means at the two ends of the shaft are preferably identical, but very particularly preferably different.

The axial securing means is preferably a means, in particular a washer, which is connected to the shaft in a material-to-material manner. The material-to-material connection can be effected by adhesive bonding, but in particular by welding.

Furthermore, the axial securing means is preferably a starlock washer which is pushed onto the shaft by way of a tool and is positioned at the respective location.

Furthermore, as shown in FIG. 7, the axial securing means 6 is preferably a thread-cutting nut 8.

In a further preferred embodiment, the axial securing means is provided integrally with the shaft, is preferably manufactured from the latter by forming. In particular, the axial securing means is a flared region. During the flaring operation, the end of the shaft which is preferably provided in tubular form is drawn up manually or mechanically by a defined angle, preferably from 80° to 100°, in particular 90°. This is preferably effected by way of a pressing or tumbling process. This preferred embodiment of the present invention has the advantage that it has a very high loadbearing capability of >5 kN. The flaring process is very inexpensive. Moreover, a flared shaft has a markedly small overall size. Preferably only one end of the shaft is flared.

A further subject matter of the present invention is, furthermore, a vehicle seat having a backrest part which is provided on a seat part such that it can be rotated by means of a backrest adjuster, the backrest adjuster having a flared component.

The comments made with respect to the other subject matter of the present invention apply equally to this subject matter of the present invention.

In the following text, the invention will be explained using FIGS. 1 to 6. These explanations are merely by way of example and do not restrict the general concept of the invention.

FIG. 2 shows the seat adjuster with the shaft.

Figure 1:
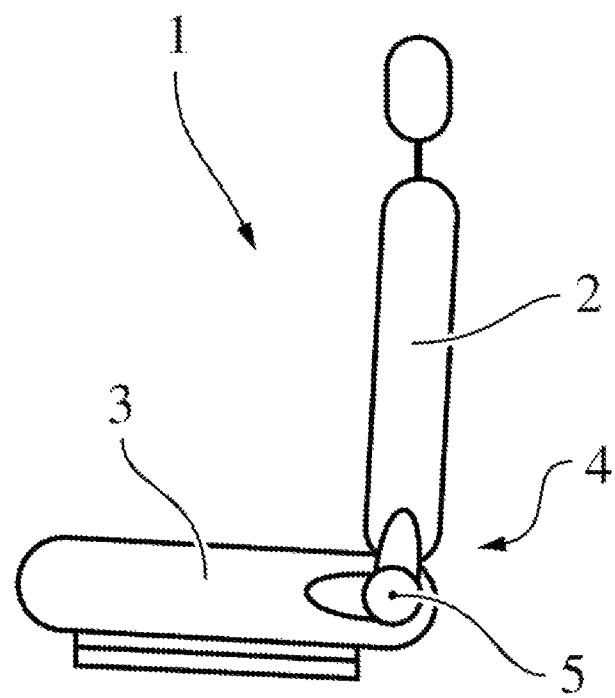
FIG. 1 shows the vehicle seat according to the invention.

FIG. 1 shows the vehicle seat 1 according to the invention which has a seat part 3, on which a backrest 2 is provided such that it can be rotated by means of a backrest adjuster 4. For example, the angular position of the backrest relative to the seat part can be set for comfort purposes by way of the backrest adjuster, for example a recliner. A backrest adjuster 4 of this type is preferably arranged on the right and left of the vehicle seat. The backrest adjuster comprises a shaft 5, on which a handwheel or a motor drive is usually provided. By way of the shaft 5, a torque is transmitted to at least one, preferably both backrest adjusters 4 for the angular adjustment of the backrest.

FIG. 2 shows that a backrest adjuster 4 is provided on the vehicle seat according to the invention both on the right and the left. Said two backrest adjusters are connected to one another by a shaft 5 which is preferably configured as a tube and by way of which a torque can be transmitted to preferably both seat adjusters. According to the invention, said shaft is then secured axially at both ends which protrude somewhat out of the respective backrest adjuster, with the result that, if the shaft 5 is bent, for example, in an accident situation, said shaft 5 is not pulled out of the backrest adjusters 4 and/or in order that said shaft 5 can increase the stability of the vehicle seat according to the invention.

Figure 3:
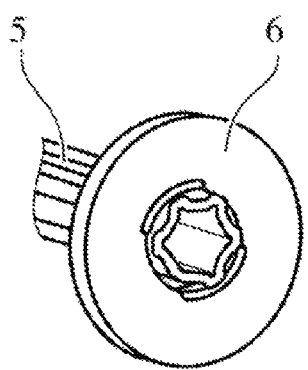
FIGS. 3 to 7 show embodiments of the axial securing means of the shaft.

FIG. 3 shows a first embodiment of an axial securing means of this type. In this case, it is a washer which has been welded onto the shaft 5.

Figure 4A:
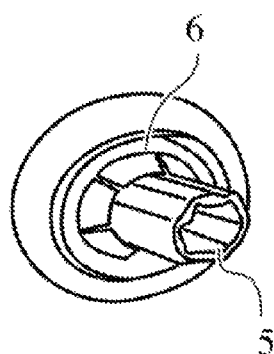
Figure 4B:
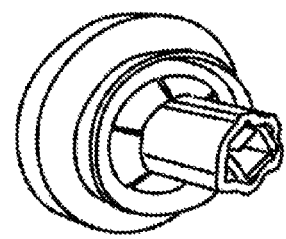
Figure 4C:
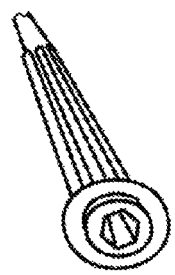

FIGS. 4a-c show a further embodiment of the axial securing means which is what is known as a starlock washer in the present case. Said starlock washer is pushed onto the shaft 5 by way of a tool and is displaced to the respectively desired position.

Figure 5:
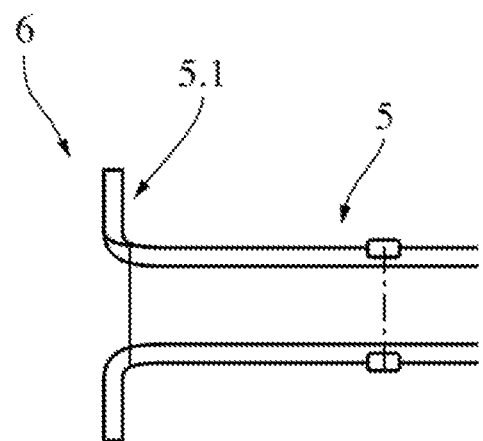
Figure 6:
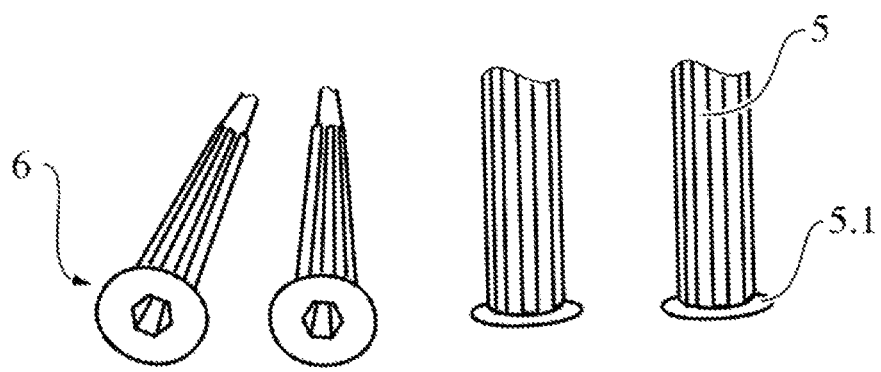
Figure 7:
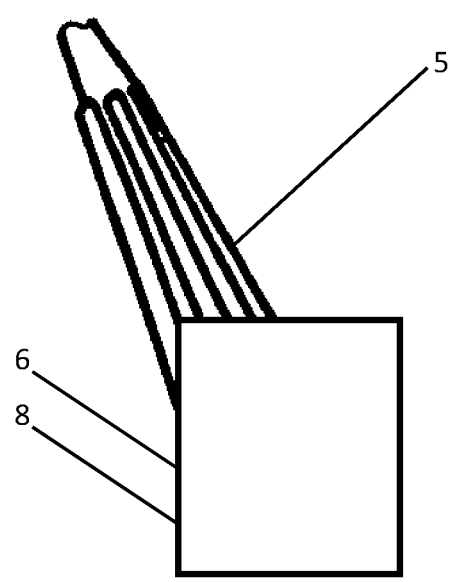

FIGS. 5 and 6 show a further embodiment of the axial securing means 6 of the shaft 5. In the present case, said axial securing means is provided integrally with the shaft 5. The axial securing means has been manufactured by being formed out of the shaft 5. The axial securing means is preferably what is known as a flared region 5.1, that is to say the shaft 5 which has been embodied here as a tube is drawn up by 90° here in this region. This embodiment of the present invention has the advantage that it saves a large amount of space and reduces weight. Moreover, this embodiment is very easy to assemble because machining of the shaft after it has been mounted can be dispensed with at least on one side.

LIST OF DESIGNATIONS

1 Vehicle seat
2 Backrest
3 Seat part
4 Backrest adjuster, recliner
5 Shaft, axle
5.1 Tulip-like widened section, goblet-shaped section, folded-over section, flared section
6 Axial securing means
8 Thread-cutting nut

The invention claimed is:

1. A vehicle seat, comprising:
a first backrest adjuster provided on a right portion of the vehicle seat;
a second backrest adjuster provided on a left portion of the vehicle seat; and
a shaft configured as a tube,
wherein the first and second backrest adjusters are connected to one another by the shaft,
wherein a circumference of the shaft is configured to transmit a torque to at least one of the first backrest adjuster and/or the second backrest adjuster,
wherein one of a handwheel or a motor drive is provided on the shaft,
wherein the first backrest adjuster has a first axial securing mechanism positioned on a first end of the shaft,
wherein the second backrest adjuster has a second axial securing mechanism positioned on the second end of the shaft,
wherein the first axial securing mechanism is a thread-cutting nut,
wherein the shaft protrudes at least partially out of the second backrest adjuster.

* * * * *

UNITED STATES PATENT AND TRADEMARK OFFICE
CERTIFICATE OF CORRECTION

PATENT NO. : 9,446,688 B2
APPLICATION NO. : 13/820062
DATED : September 20, 2016
INVENTOR(S) : Jörg Seibt It is certified that error appears in the above-identified patent and that said Letters Patent is hereby corrected as shown below:

ON THE TITLE PAGE

Page 1, Item 56 (References cited – U.S. Patent Documents), U.S. Patent No. 7,513,573-B2 4-2009 WAHLS et al. should be included.

Page 1, Item 56, (Other Publications) International Search Report for International Application No. PCT/EP2011/004566 and English translation, date of mailing Nov. 9, 2011, 5 pages, should read as follows:

--International Search Report for International Application No. PCT/EP2011/004533 and English translation, date of mailing Nov. 9, 2011, 5 pages--

Page 2, Item 56, (References cited – Foreign Patent Documents) CN 10125856 A should read as follows:

--CN 101252856 A--

Signed and Sealed this
Thirteenth Day of December, 2016

Michelle K. Lee
*Director of the United States Patent and Trademark Office*